No. 896,113. PATENTED AUG. 18, 1908.
A. O. HUFFMAN.
FENCE.
APPLICATION FILED APR. 16, 1908.

2 SHEETS—SHEET 1.

Witnesses:
Bess Wills.
Clifton Ratliff

Inventor:
Alfred O. Huffman.
By Frank P. Shepard, Atty.

No. 896,113. PATENTED AUG. 18, 1908.
A. O. HUFFMAN.
FENCE.
APPLICATION FILED APR. 16, 1908.

2 SHEETS—SHEET 2.

Witnesses:
Bess Wills
Clifton Ratliff

Inventor:
Alfred O. Huffman.
By Frank P. Shepard, Atty.

UNITED STATES PATENT OFFICE.

ALFRED O. HUFFMAN, OF NORMAN, OKLAHOMA.

FENCE.

No. 896,113.   Specification of Letters Patent.   Patented Aug. 18, 1908.

Application filed April 16, 1908. Serial No. 427,460.

*To all whom it may concern:*

Be it known that I, ALFRED O. HUFFMAN, a citizen of the United States, residing at Norman, in the county of Cleveland and State of Oklahoma, have invented certain new and useful Improvements in Fences, of which the following is a full, clear, and exact description, reference being had to the accompanying drawings.

This invention pertains more particularly to wire fences, and one of its objects is to maintain the fence wires in a taut condition.

Another object is to have the gate portions of the fence open and close more easily, and in planning the operation of the parts of the invention the means employed to assist in moving the gate act to keep the wires of the fence taut.

Other objects and advantages of the invention will be set forth in the ensuing description and pointed out in the appended claims.

Figure 1:
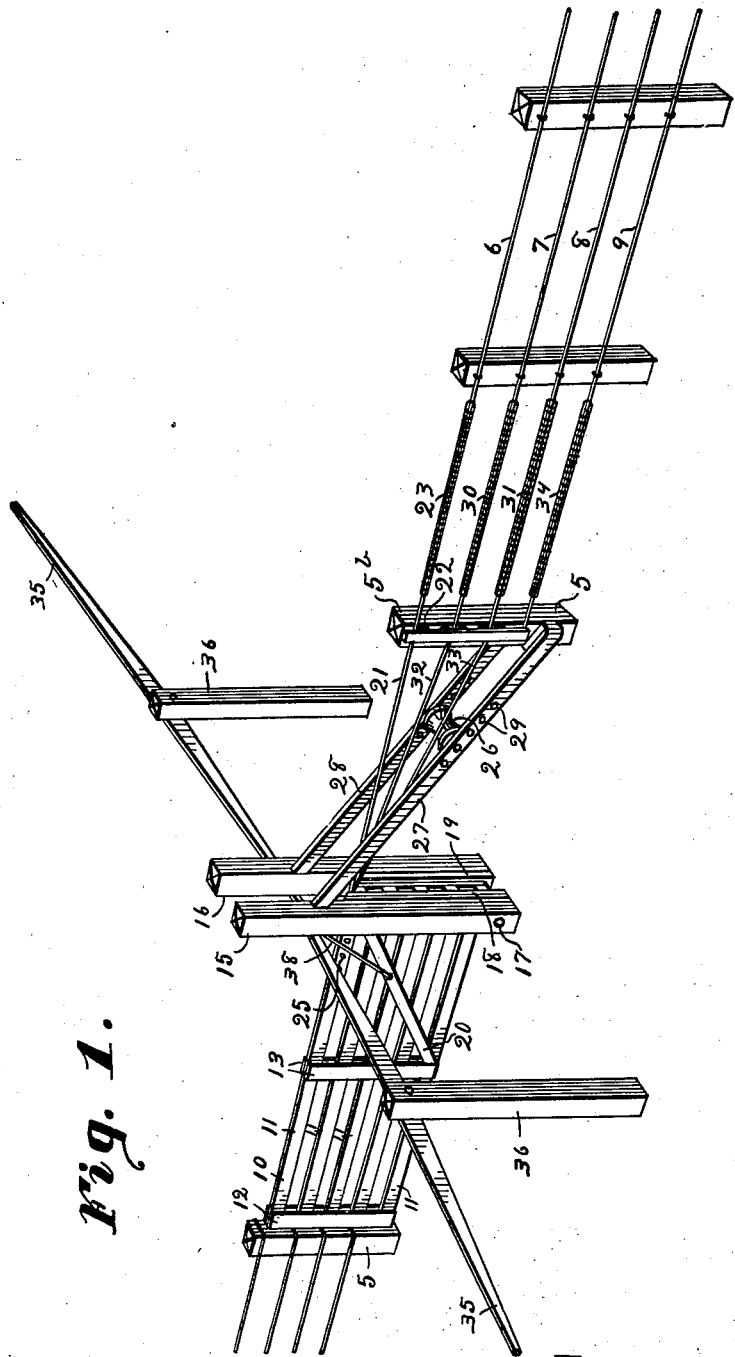
Figure 2:
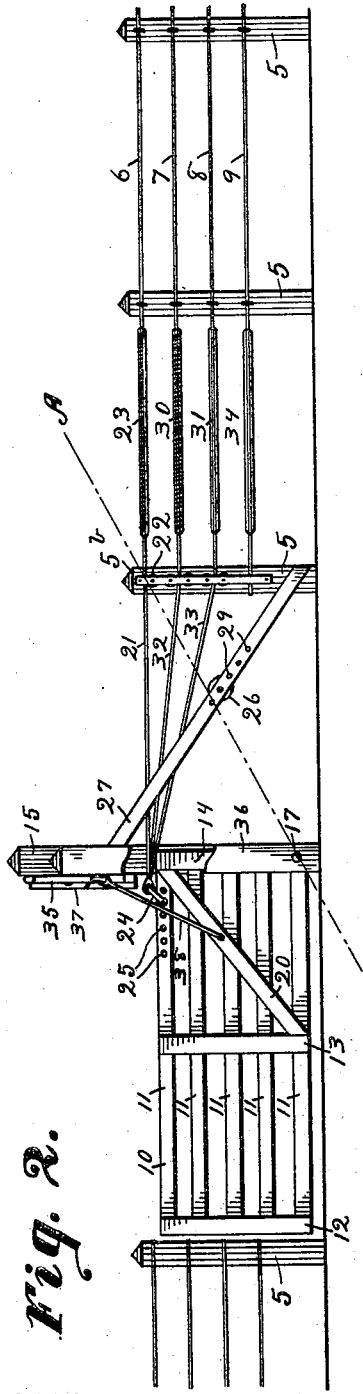
Figure 3:
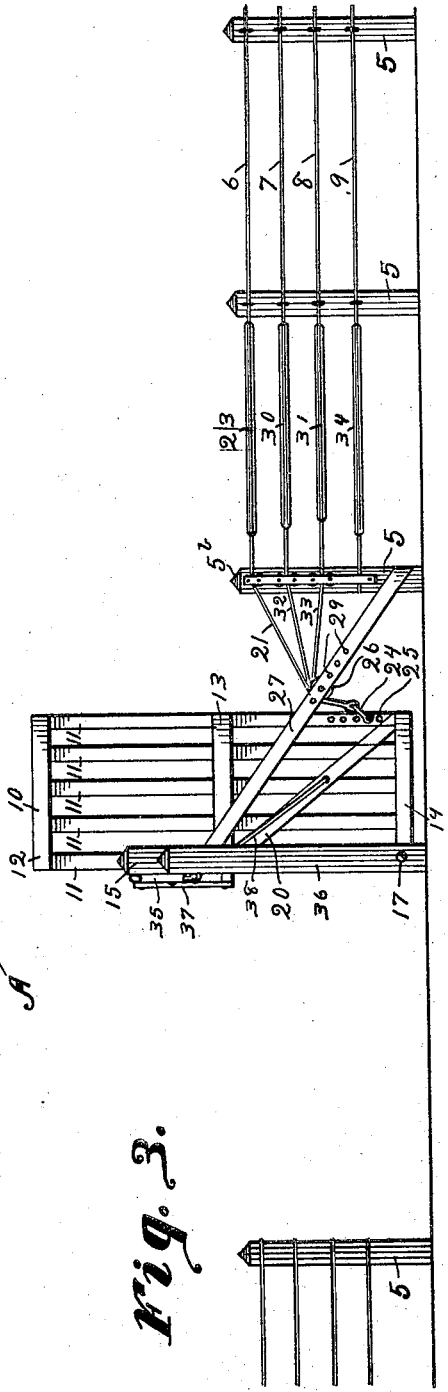
Figure 4:

Referring to the accompanying drawings: Figure 1 is a perspective view of a fence and gate of my improved construction, showing the gate in closed position. Fig. 2 is an elevation view of the parts shown in Fig. 1, portions of certain posts being broken away to expose the upper corner of the pivotal end of the gate. Fig. 3 is an elevation view of the parts shown in Fig. 1, but showing the gate in open position. Fig. 4 is a greatly enlarged elevation view of one of certain tension springs used in the fence, showing also a portion of flexible cable attached thereto.

Referring to the several figures, in all of which like characters of reference designate like parts, the improved fence comprises the usual upright posts 5 which are set into the ground at regular intervals to support the horizontal fence wires 6, 7, 8, and 9.

The gate portion 10 of the fence consists in this instance of a number of horizontal boards or slats 11 which are joined together at their ends and centers by vertical uprights 12, 13, and 14. The gate 10 is pivoted to open and close in a vertical plane, and in arranging to pivot the gate two large posts 15 and 16 are set into the ground in position to have the gate swing between them, a pivot-pin 17 passing through said posts and through the pivoted end of said gate at the lower corner thereof. The inner or adjacent faces of the posts 15 and 16 are provided with wooden cleats 18 and 19, respectively, which act as guides for the gate 10 to slide against in its movements without contacting the extreme upper ends of said posts, and the gate is provided on each side with a brace-cleat 20, thus filling said gate out to the full thickness formed by its end uprights 14 so that it may slide smoothly against the cleats 18 and 19 at any position.

To assist in lifting the weight of the gate 10 in starting it toward open or closed position, a cord, cable, chain, or other flexible connection 21 is attached to the upper corner of the pivotal end of the gate 10 and passes movably over a pulley 22 on the upper end of the first fence-post $5^b$, said connection 21 being then attached to a tension spring 23 and thus connected to the upper wire 6 of the fence. The flexible connection 21 is attached to the upper slat 11 of the gate 10 by a clevis 24 whose pin passes through a hole 25 in said slat, a number of the holes 25 being provided along the slat 11 so that the clevis 24 may be brought to different points to adjust the tension and lifting capacity of the spring 23.

In swinging the gate 10 from closed toward open position, the spring 23 acts upon the flexible connection 21 to pull the upper portion of the gate toward the fence-post $5^b$, said spring continuing to shorten and acting to open said gate until the point of attachment of the clevis 24 with the gate touches a straight line A—A passing through the pivot-pin 17 and the supporting pulley 22 of the flexible connection 21; after which the gate finishes its movement to the full open position shown in Fig. 3 against the action of said spring 23 and stretches the same into a tension that will assist to start the gate toward closed position.

Since a movement of the clevis 24 upon the gate 10 in a direction to increase the tension of the spring 23 will carry said clevis away from the dead-center line A—A when the gate stands in closed or horizontal position, said clevis will after said movement stand closer to said line A—A when the gate is in open or vertical position, thus decreasing the tension of said spring and lessening the power to start the gate from open toward closed position. Therefore, in order that the spring 23 may pull more nearly straight upward upon the gate 10 to start it toward closed position, a pulley 26 is mounted between two brace-bars 27 and 28 in such position that the flexible connection 21 may lift more nearly straight upward on the gate after passing over said pulley.

The brace-bars 27 and 28 are provided with a number of holes adapted to receive the pivot-pin of the pulley 26, in order that said pulley may be adjusted in height or with relation to the dead-center line A—A; and since the adjusting movement of said pulley 26 should be in a direction nearly at right angles to said line A—A the brace-bars 27 and 28 extend from a point near the ground on the fence-post 5$^b$ up diagonally to an upper portion of the posts 15 and 16. In this position these brace-bars 27 and 28 properly brace the posts 15 and 16 against movement lengthwise of the fence. Other springs 30 and 31 may be employed in addition to the spring 23 to act upon the gate for the purposes stated, these springs being attached to the gate by flexible connections 32 and 33, like the connection 21 aforesaid; and these springs 30 and 31 form connections between said elastic connections 32 and 33 and the two fence-wires 7 and 8, like the spring 23. These springs 23, 30 and 31 act at all times to keep the fence-wires 6, 7, and 8 taut. The lower fence-wire 9, which in this instance is provided with a spring 34, may be connected with and adapted to act upon the gate 10 if desired.

For opening the gate 10 from vehicles, a lever 35 extends out from the pivotal end of said gate along the road-side at either side of the fence, each lever being fulcrumed near its center upon the upper end of a supporting standard 36 at such height that the operator may reach it from a buggy or from horse back. The ends of the levers 35 adjacent the gate are guided in vertical movement by the posts 15 and 16 and by vertical bars 37 which retain said levers in guiding contact with said posts. The ends of the levers are operatively connected with the gate 10 by connecting-rods 38 and said rods 38 are connected to said gate at such point that as the gate moves from closed to open position, and vice versa, said point moves across a dead-center line extending from the pivotal point of the gate to the ends of said levers. By this arrangement of parts the operator, by pulling down on the outer end of either of the levers 35 can start the gate in either direction with sufficient force, with the assistance of the springs 23, 30, and 31, to have it complete its movement into open or closed position.

The foregoing being a full, clear, and exact description of the invention, what I claim and desire to secure by Letters Patent is:—

1. In a fence, a gate member pivoted to open and close on a horizontal axis, a supporting standard positioned suitably remote from the pivotal point of the gate member in the plane of movement thereof, a tension spring member connecting the upper edge of the gate member and the upper end of the supporting standard, and means for adjusting the position of the point of attachment of said spring member along the upper edge of the gate member.

2. In a fence, a gate member pivoted to open and close on a horizontal axis, a fence-post suitably remote from the pivotal point of the gate member in the plane of movement thereof, a flexible connection attached to the gate member and extending movably over a support on the fence-post, and means acting to impart pull to said flexible connection.

3. In a fence, a gate member pivoted on a horizontal axis, a fence-post placed suitably remote from the pivotal point of said gate member and in the plane of movement thereof, a flexible connection attached to the upper portion of the pivotal end of the gate member and extending movably over a support on the fence-post, means for imparting pull to said flexible member, and means for adjusting the position of the point of attachment of said flexible member along the top of said gate member.

4. In a fence, a gate member pivoted on a horizontal axis, a flexible connection attached to the top of the pivotal end of the gate member and extending movably over a suitable support, a spring imparting pull to said flexible connection, means maintaining the spring under tension, and means for allowing the adjustment of the point of attachment of said flexible connection.

5. In a fence, fence-posts, wires supported by the fence-posts, a gate member in the line of the fence adapted to open and close on a horizontal axis, a flexible connection attached to the gate member and extending movably over one of the fence-posts, a tension spring connecting said flexible connection with one of the fence-wires, the point of connection of said gate and flexible connection being so positioned with relation to the pivotal point of the gate that the spring normally tends to assist in starting said gate from closed to open position.

6. In a fence, fence-posts, fence-wires supported by the fence-posts, a gate member mounted in the line of the fence on a horizontal axis, the pivotal point of said gate member being at a lower corner thereof, a flexible connection attached to an upper portion of the gate member and extending movably over one of the fence-posts, a tension spring having one of its ends attached to said flexible connection and being maintained under tension by having its opposite end attached to one of the fence-wires, means allowing the adjustment of the attachment of said flexible connection along the top of the gate member.

7. In a fence, fence-posts, wires supported by said fence-posts, a gate member in the line of the fence pivoted on a horizontal axis, the pivotal point of the gate member being at a lower corner thereof, a flexible connection attached to the gate member above its pivotal point and extending over a pulley on the adjacent fence-post, a tension spring secured to said flexible connection and connecting the same to one of the fence-wires, and a pulley mounted in position to support the flexible connection when the gate member is in open position.

8. In a fence, fence-posts, wires supported by the fence-posts, a gate-post, a gate member pivoted to the gate-post and adapted to open and close on a horizontal axis, the gate member being pivoted at a lower corner, a brace-bar extending from an upper portion of the gate-post to a lower portion of the adjacent fence-post, a flexible connection attached to the gate member above the pivotal point thereof and extending over a pulley on said adjacent fence-post, a tension spring connecting the free end of said flexible connection with one of the fence-wires, a pulley mounted on said brace-bar in position to have the flexible connection rest upon it when the gate member is open.

9. In a fence, fence-posts, fence-wires supported by said posts, a gate-post, a gate member pivoted at one of its lower corners to said gate-post and adapted to open and close on a horizontal axis, a flexible connection attached to the upper part of the gate over the pivotal point thereof and extending horizontally over a pulley on the adjacent fence-post, a tension spring connecting said flexible connection with one of the fence-wires, a brace-bar extending from an upper portion of said gate-post to the lower portion of said adjacent fence-post, a pulley mounted on said brace-bar in position to have the flexible connection supported thereby when the gate member is in open position, and means for adjusting the position of said pulley on said brace-bar.

Witness my hand this 31 day of March, 1908.

ALFRED O. HUFFMAN.

Witnesses:
BESS WILLS,
S. A. LAYTON.